UNITED STATES PATENT OFFICE.

WILLIAM N. JORDAN, OF CAMBRIDGE, MASSACHUSETTS, ASSIGNOR TO HIMSELF, PORTER M. SMART, AND HENRY W. COOK.

IMPROVEMENT IN PAINT COMPOUNDS.

Specification forming part of Letters Patent No. 107,059, dated September 6, 1870.

I, WILLIAM N. JORDAN, of Cambridge, in the county of Middlesex and State of Massachusetts, have invented certain Improvements in Paints, of which the following is a specification:

The nature of my invention consists in preparing paints with dissolved caoutchouc as a basis, so as to produce certain beneficial effects—that is to say, to make paints which will be cheap, durable, and capable of application to all qualities of work, which will flow easily, spread over much more surface than common paints, and dry quickly without becoming tacky.

My paints are compounded in the following manner, viz: First, I dissolve five pounds caoutchouc in forty gallons benzole; second, I dissolve five pounds gum-shellac in three gallons alcohol; third, I dissolve five pounds resin in five gallons benzole; and I designate these three compounds as "rubber solution," "shellac solution," and "resin solution."

To make white paint, I use of the rubber solution, twelve gallons; chloric acid, four ounces; oil-linseed, fifteen gallons; shellac solution, one pint; white-lead, four hundred pounds; spirits turpentine, one gallon. This makes forty gallons of paint, which can be used for either inside or outside work, and can be tinted by adding colors in the manner usual in mixing common paints.

To make red paint, I use of rubber solution, fifteen gallons; oil-linseed, ten gallons; oil-resin, two gallons; resin solution, three gallons; japan, one-half gallon; mineral-red, one hundred and fifty pounds; spirits turpentine, one-half gallon. This makes forty gallons of red paint.

To make black paint, I use of rubber solution, three-fourths of a gallon; coal-tar, one-half pint; japan, one-half pint; shellac solution, one-half pint; nitrate of iron, one-half ounce; drop-black, four ounces. This makes one gallon of black paint.

To make green paint, I use of rubber solution, one-half gallon; magnesia-green, three pounds; oil-linseed, three pints; shellac solution, one-half pint. This makes one gallon of green paint.

In compounding these paints no heat is required; but the various ingredients are thoroughly mixed together, and may be strained before using, if required.

If the mixture should be too thick for any required work, it can be thinned with oil, spirits of turpentine, or benzole, and, if too glossy, can be flatted in the ordinary manner.

The white paint will cost about five-eighths of the amount of cost of lead-and-oil paint for the same quantity, as it requires from eight to ten pounds of lead to one gallon of liquid, while with the ordinary paint about twenty-five pounds is required. This is an important item, more especially as the paint made by my process is believed to be superior in every respect to lead and oil.

One other feature is worthy of notice, viz: By omitting the oil in my various mixtures, and substituting for it the same amount of rubber solution, I can paint iron which is subjected to heat, such as stove-funnels, stoves, &c., and the paints will be durable, and not liable to change color; and, further, my regular compounds (with the oil) above described will stand exposure to heat of the sun and to changes of temperature better than any other paint known to me.

I claim as my invention—

The paints above described, as compounded of the ingredients, in the proportions, and for the purposes set forth.

WILLIAM N. JORDAN.

Witnesses:
ISAAC STORY,
WILLIAM DENNISON.